(12) United States Patent
Macpherson et al.

(10) Patent No.: US 11,027,713 B2
(45) Date of Patent: Jun. 8, 2021

(54) BRAKE NVH COUNTERMEASURE

(71) Applicant: Robert Bosch GmbH, Stuttgart (DE)

(72) Inventors: Alex Macpherson, Novi, MI (US); Ryan A. Kuhlman, Farmington Hills, MI (US); Jacob Bacheldor, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 15/855,293

(22) Filed: Dec. 27, 2017

(65) Prior Publication Data

US 2019/0193698 A1 Jun. 27, 2019

(51) Int. Cl.
*B60T 8/00* (2006.01)
*B60T 8/32* (2006.01)
*B60T 8/173* (2006.01)
*B60T 7/04* (2006.01)
*B60T 8/172* (2006.01)
*B60T 13/74* (2006.01)

(52) U.S. Cl.
CPC ............ *B60T 8/3255* (2013.01); *B60T 7/042* (2013.01); *B60T 8/172* (2013.01); *B60T 8/173* (2013.01); *B60T 13/74* (2013.01); *B60T 8/00* (2013.01); *B60T 2220/04* (2013.01); *B60T 2270/82* (2013.01); *B60Y 2306/09* (2013.01)

(58) Field of Classification Search
CPC ........ B60T 8/3255; B60T 8/173; B60T 13/74; B60T 8/172; B60T 7/042; B60T 8/00; B60T 2270/82; B60T 2220/04; B60Y 2306/09
See application file for complete search history.

(56) References Cited

U.S. PATENT DOCUMENTS

| 6,923,513 | B2 | 8/2005 | Kamiya et al. |
| 7,021,727 | B2 | 4/2006 | Kamiya et al. |
| 7,380,890 | B2 | 6/2008 | Tobler et al. |
| 8,265,846 | B2 | 9/2012 | Kinser et al. |
| 2004/0212246 | A1 | 10/2004 | Kamiya et al. |
| 2004/0222696 | A1* | 11/2004 | Kamiya .................... B60T 8/00 303/191 |
| 2007/0216224 | A1 | 9/2007 | Schmitt et al. |

(Continued)

FOREIGN PATENT DOCUMENTS

| CN | 104670203 A | 6/2015 |
| CN | 105946824 A | 9/2016 |

OTHER PUBLICATIONS

Chinese Patent Office First Office Action for Application No. 201811600513.0 dated Nov. 12, 2020 (13 pages including statement of relevance).

*Primary Examiner* — Ian Jen
(74) *Attorney, Agent, or Firm* — Michael Best & Friedrich LLP

(57) ABSTRACT

Systems and methods are described for controlling a vehicle braking system. An electronic controller determines a target deceleration based at least in part on a detected displacement position of a brake pedal and determines an adjusted braking pressure to be applied to at least one wheel of the vehicle such that, regardless of the displacement position of the brake pedal and the target deceleration, the adjusted braking pressure is maintained outside of a defined range of braking pressures that corresponds to a NVH condition for the at least one wheel. The adjusted braking pressure is then applied to the at least one wheel of the vehicle.

20 Claims, 4 Drawing Sheets

(56) References Cited

U.S. PATENT DOCUMENTS

| | | | | |
|---|---|---|---|---|
| 2010/0250081 A1* | 9/2010 | Kinser | ............... | B60T 8/00 |
| | | | | 701/70 |
| 2010/0274457 A1* | 10/2010 | Cahill | ............... | B60T 13/741 |
| | | | | 701/70 |
| 2011/0130935 A1 | 6/2011 | Krueger et al. | | |

* cited by examiner

| Input Rod Travel (mm) | Pressure (bar) | | Deceleration Vehicle (m/s$^2$) |
| --- | --- | --- | --- |
| | Front | Rear | |
| 0 | 0 | 0 | 0 |
| 0.5 | 0 | 0 | 0 |
| 2.2 | 0 | 10.5 | 0.3 |
| 3.4 | 0 | 21 | 0.6 |
| 4.4 | 0 | 31.5 | 0.9 |
| 5 | 11 | 11 | 1.1 |
| 5.4 | 12.5 | 12.5 | 1.25 |
| 5.9 | 14.7 | 14.7 | 1.47 |
| 6.5 | 17.5 | 17.5 | 1.75 |
| 7.7 | 23 | 23 | 2.3 |
| 9.95 | 38 | 38 | 3.8 |
| 11 | 47 | 47 | 4.7 |
| 13 | 68 | 68 | 6.8 |
| 15 | 92 | 92 | 9.2 |
| 17.5 | 130 | 130 | 10 |
| 19 | 165 | 165 | 12 |

*FIG. 4*

BRAKE NVH COUNTERMEASURE

BACKGROUND

The present invention relates to systems and methods for reducing noise, vibration, and harshness (NVH) during braking conditions for a vehicle.

SUMMARY

Foundation brake noise and axle groan is an industry problem that costs OEMs millions of dollars in brake warranty and additional part costs. Most of this noise occurs at very low caliper pressures and thus at low decelerations due to the dynamic instability and vibration of the caliper/lining/rotor interface. At higher pressures, this instability is gone, which explains why brake noise may not occur with higher decelerations. An additional noise problem is rear axle brake induced moan/groan, which may occur, for example, when backing out of a driveway on a humid morning and lightly touching the brakes.

In some implementations, a braking system may be implemented as an isolated brake-by-wire system where the pedal feel is de-coupled from the actual brake foundation system. Once a range of pressures is identified that causes high frequency brake noise or low frequency axle moan, the system is configured to either hold off pressure or increase pressure to entirely avoid applying braking pressures within the predefined problematic range with no effect on pedal feel. Furthermore, a consistent target deceleration can be achieved by blending the front and rear axle pressures so that the driver senses no performance differences.

In one embodiment, the invention provides a brake system for a vehicle including a brake pedal position sensor and an electronic controller. The brake pedal position sensor is configured to detect a displacement position of a brake pedal of the vehicle. The electronic controller is configured to determine a target deceleration based at least in part on the detected displacement position of the brake pedal and to determine an adjusted braking pressure to be applied to at least one wheel of the vehicle such that, regardless of the brake pedal input and the target deceleration, the adjusted braking pressure for the at least one wheel is maintained outside of a defined range of braking pressures corresponding to a NVH condition for the at least one wheel. After determining the adjusted braking pressure for the at least one wheel, the electronic controller transmits the signal to a braking actuator. The signal is configured to cause the braking actuator to apply the adjusted braking pressure to the at least one wheel of the vehicle.

In another embodiment, the invention provides a method for controlling a vehicle braking system. An electronic controller determines a target deceleration based at least in part on a detected displacement position of a brake pedal and determines an adjusted braking pressure to be applied to at least one wheel of the vehicle such that, regardless of the displacement position of the brake pedal and the target deceleration, the adjusted braking pressure is maintained outside of a defined range of braking pressures that corresponds to a NVH condition for the at least one wheel. The adjusted braking pressure is then applied to the at least one wheel of the vehicle.

Other aspects of the invention will become apparent by consideration of the detailed description and accompanying drawings.

BRIEF DESCRIPTION OF THE DRAWINGS

FIG. 4 is an example of a look-up table used by the braking control system of FIG. 1 to reduce NVH while maintaining a target braking force.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
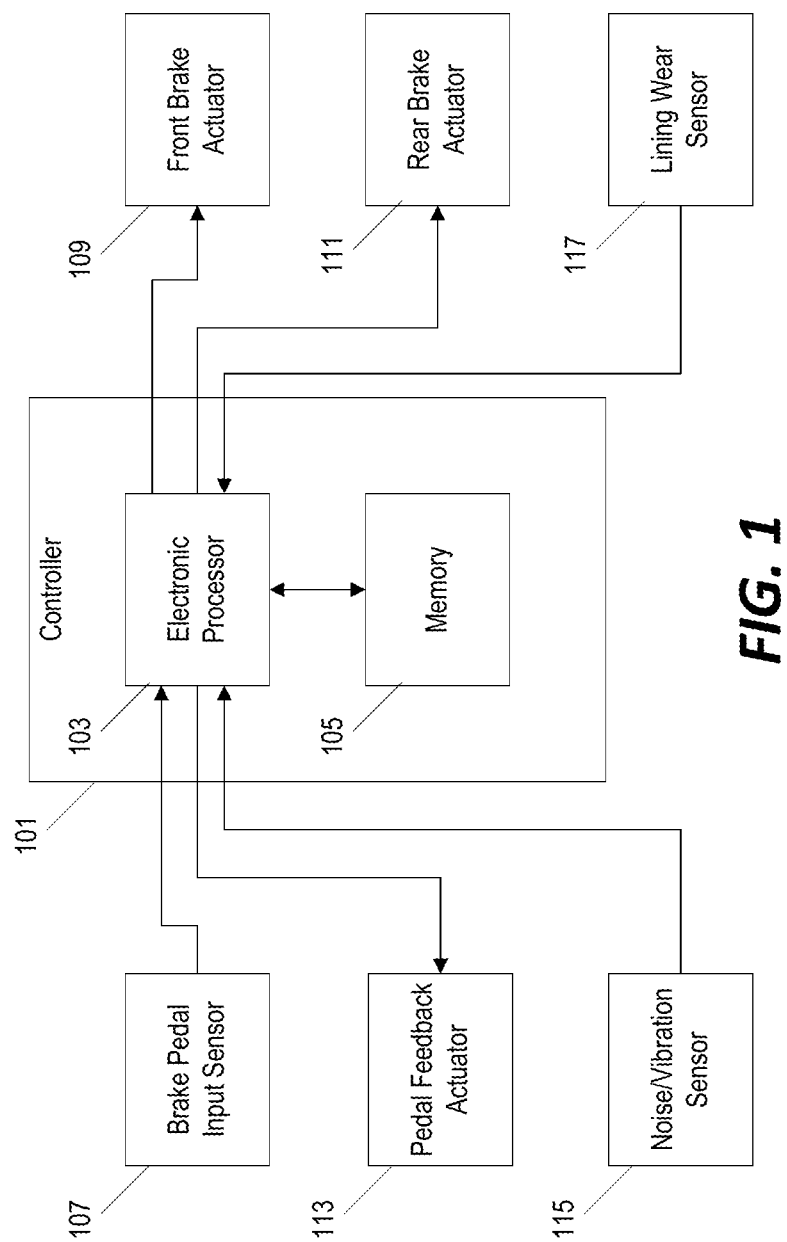
FIG. 1 is a block diagram of a braking control system according to one embodiment.

FIG. 1 illustrates an example of a control system for a vehicle braking system. An electronic controller 101 includes an electronic processor 103 and a non-transitory computer-readable memory 105. The memory 105 stores data and instructions that are executed by the electronic processor 103 to provide the functionality of the control system such as described herein. The control system of FIG. 1 is configured to operate as a "steer-by-wire" system. Accordingly, the brake pedal of the vehicle is not mechanically coupled to the brake actuators. Instead, the controller 101 is communicatively coupled to a brake pedal input sensor 107 that is configured to monitor a displacement position of a rod coupled to the brake pedal. Based on the detected displacement of the brake pedal by the brake pedal input sensor 107, the controller 101 transmits control signals to one or more brake system actuators which are configured to apply a defined level of braking pressure to one or more wheels of the vehicle.

For example, in the system of FIG. 1, the vehicle includes a front brake actuator 109 and a rear brake actuator 111. The controller 101 sends a control signal to the front brake actuator 109 indicative of an amount of braking pressure to apply to the front axle wheels of the vehicle. In response to receiving the control signal, the front brake actuator 109 generates a fluid pressure causing a caliper to close around a rotor of at least one of the front axle wheels in order to apply a braking force to the front axle wheels in accordance with the braking pressure as defined by the control signal. Similarly, the controller 101 sends a second control signal to the rear brake actuator 111 indicative of an amount of braking pressure to apply to the rear axle wheels of the vehicle and the rear brake actuator 111 responds by applying a fluid pressure force to the caliper of the rear axle brake in order to apply a braking force to the rear axle wheels in accordance with the braking pressure as defined by the second controller signal.

In the example of FIG. 1, the system is configured to include two separate brake actuators—one for the front axle wheels and one for the rear axle wheels. However, in other implementations, the vehicle may be configured with more, fewer, or differently configured brake actuators. For example, in some implementations, the vehicle may be configured to include only a single brake actuator system that is configured to receive a control signal from the controller 101 and to apply braking forces to one or more of the wheels of the vehicle individually or as groups in accordance with the control signal. In other implementations, the vehicle may be configured to include a separate brake actuator for each wheel of the vehicle. In such systems, the controller 101 may be configured to generate a separate control signal for each brake actuator to apply symmetric or asymmetric braking strategies.

The control system of FIG. 1 also includes a pedal feedback actuator 113. The pedal feedback actuator 113 is configured to provide a counteracting force that resists displacement of the brake pedal. In some implementations, the pedal feedback actuator 113 is configured to gradually increase the counteracting force as the displacement of the brake pedal increases in order to provide tactile feedback to the operator of the vehicle regarding the degree of displacement. The counteracting force also returns the brake pedal to a home position after the operator's foot is lifted from the pedal (or as the displacement force provided by the driver's foot is reduced). In some implementations, the pedal feedback actuator 113 is implemented using a mechanical spring, a hydraulic system, or a pneumatic system and is configured such that increased displacement of the brake pedal increases the magnitude of the counteracting force without any electrical control or intervention. However, in other implementations, the pedal feedback actuator 113 includes an electrically actuated system that is in communication with the controller 101 and adjusts the magnitude of the counteracting force based on a control signal received from the controller 101.

In some implementations, the controller 101 is also communicatively coupled to one or more noise and/or vibration sensors 115 that are configured to detect high frequency brake noise and/or low frequency axle "moan" indicative of a noise, vibration, or harshness (NVH) condition of the vehicle. Also, in some implementations, the controller 101 is communicatively coupled to one or more lining wear sensors 117 configured to monitor a level of wear/deterioration of one or more brake pads of the vehicle.

It is noted that FIG. 1 illustrates only one example of a control system. Other implementations may include more, fewer, or different components communicatively coupled to the controller 101. For example, some systems may not include a lining wear sensor 117 and/or a noise/vibration sensor 115. Similarly, as discussed above, some implementations may not include a pedal feedback actuator 113 in communication with the controller 101 (e.g., systems where the pedal feedback actuator 113 is implemented as a spring).

Figure 2:
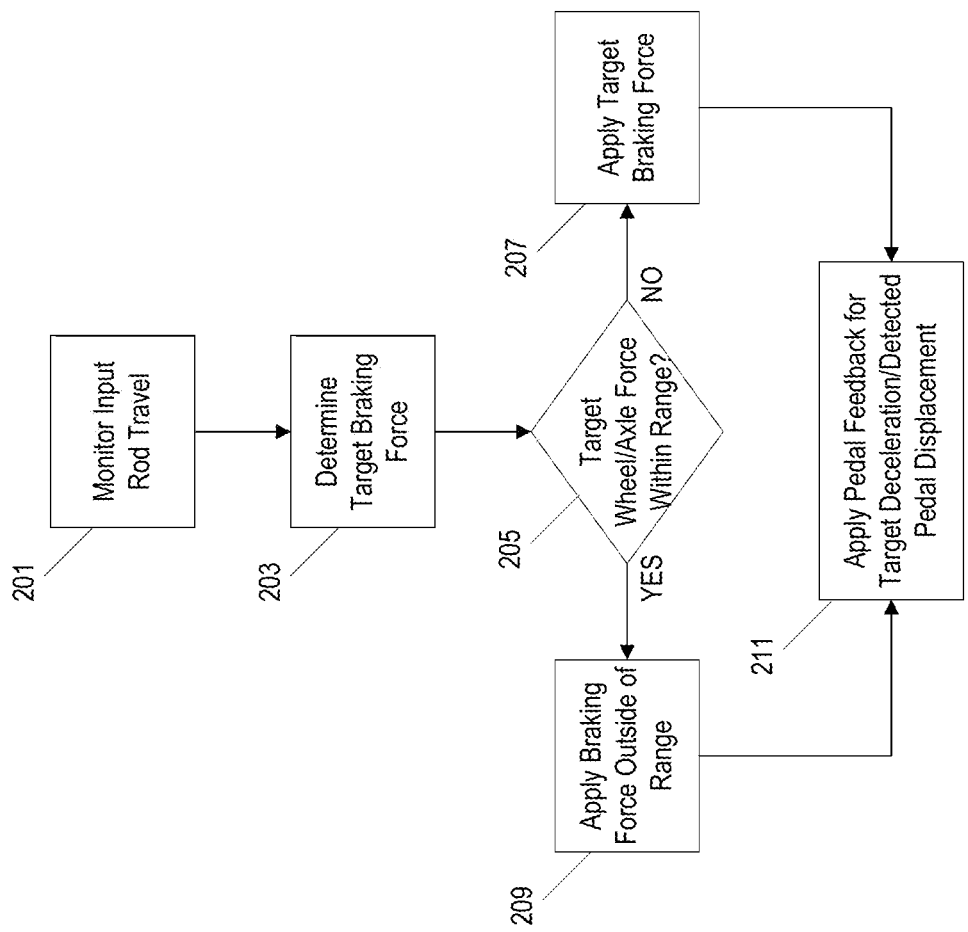
FIG. 2 is a flowchart of a method for applying a braking force and interacting with a user interface control using the braking control system of FIG. 1.

The system of FIG. 1 is configured to reduce or eliminate NVH noise in the vehicle by defining a range of braking pressures corresponding to an NVH condition for a particular wheel or axle of the vehicle and adjusting the braking pressures to maintain the braking pressure that is applied to the particular wheel (or wheels of the axle) outside of the predefined/predetermined range. FIG. 2 illustrates one example of a method implemented by the control system of FIG. 1 for reducing or eliminating NVH noise. The controller 101 monitors the input rod travel/displacement (step 201) and determines a target braking force for one or more wheels of the vehicle (step 203). In some implementations, the controller 101 is configured to first determine a target deceleration based on the detected displacement and to determine an initial target braking force for each wheel/axle of the vehicle based on the target deceleration.

If the controller determines that the initial target braking force for a particular axle/wheel is outside of a defined range of braking forces corresponding to an NVH condition for the particular axle/wheel (step 205), then the controller 101 transmits a signal to the braking actuator causing the braking actuator to apply the initial target braking force to the wheel(s) (step 207). However, if the controller 101 determines that the initial target braking force is within the predefined range of forces corresponding to the NVH condition for that axle/wheel (step 205), then the controller 101 determines an adjusted braking pressure to be applied to the wheel and transmits a signal to the braking actuator causing the braking actuator to apply the adjusted braking force to the wheel(s) (step 209).

The controller 101 is configured to determine an adjusted braking pressure that is outside of the defined range of braking pressures. For example, the controller 101 may adjust the braking pressure to another defined braking pressure value that is lower than the range or that is higher than the range. Furthermore, in some implementations, the controller 101 is configured to make a corresponding adjustment to the initial target braking pressure for one or more other wheels of the vehicle to achieve the target deceleration despite the adjustment to the individual braking pressure(s). In either case (i.e., whether the initial target braking pressure is applied or the adjusted braking pressure is applied), the system is configured to generate the same pedal feedback corresponding to the total target deceleration and/or the actual displacement of the brake pedal (step 211).

As noted above, in some implementations, the controller 101 is in communication with one or more lining wear sensors 117 configured to monitor a level of brake pad wear. In some such implementations, the controller 101 is configured to disable the NVH compensation of FIG. 2 in response to a determination, based on an output from the lining wear sensor 117, that one or more of the vehicle brake pads are worn beyond a defined threshold level. Accordingly, the controller 101 is configured to simply apply the target braking force (step 207) when the brake pad wear threshold is exceeded—regardless of whether the target wheel/axle braking force is within the defined range corresponding to the NVH condition. Furthermore, in some implementations, the controller 101 is configured to output a signal activating an indicator (e.g., a light on the vehicle dash) indicating when the brake pad wear threshold is exceeded and/or that the NVH compensation function is disabled.

Figure 3:
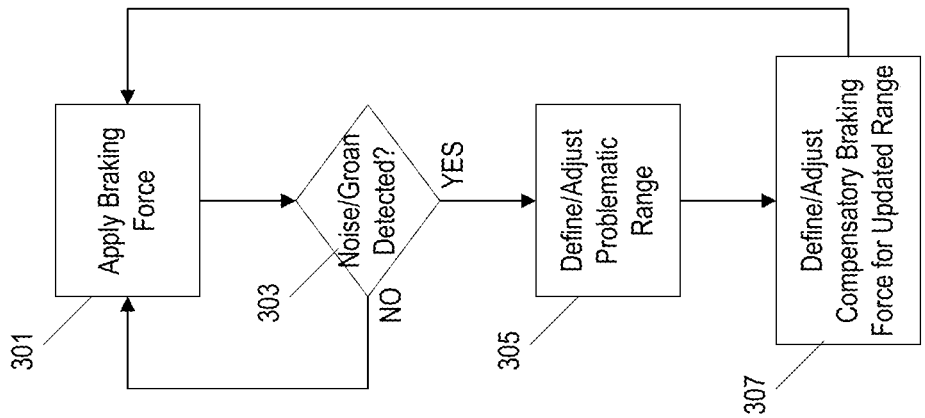
FIG. 3 is a flowchart of a method for adjusting a defined range corresponding to NVH in a braking system using the braking control system of FIG. 1.

In some implementations, the control system of FIG. 1 is configured to define and adjust the defined range of braking pressures based on feedback from the noise/vibration sensor 115 of FIG. 1. FIG. 3 illustrates one example of a method for defining and adjusting the defined range of braking pressures corresponding to the NVH condition. The braking system applies a braking force to the wheels of the vehicle (step 301) and, if sounds/vibrations corresponding to wheel noise or axle groan are detected by the noise/vibration sensor 115 (step 303), the controller 101 defines or adjusts a problematic range for the wheel or axle (i.e., a range of braking pressure values corresponding to the noise or groan) (step 305). After the defined range is defined/adjusted, the controller 101 uses the updated range to avoid NVH noise and defines/adjusts compensatory braking to be applied to the other wheels of the vehicle in order to avoid the defined range of braking pressures (step 307).

However, in some implementations, the controller 101 is configured to receive information defining the range of braking pressures corresponding to the NVH condition without necessarily defining the range based on sensor feedback. For example, the system may be configured to receive a defined range of pressures (or an updated defined range of pressures) as part of a regular software update for the vehicle. As another example, the system may be configured to define the range of braking pressures corresponding to the NVH condition based on data collected during an automated or partially automated tuning procedure. In some implementations, the controller 101 is configured to use one or more of these or other methods for defining the range of braking pressures corresponding to the NVH condition in addition to or instead of defining the range of braking pressures based on feedback from the noise/vibration sensors 115. Accordingly, as noted above, some such implementations of the system might not include any noise/vibration sensors 115 to automatically monitor NVH conditions.

In some implementations, the controller 101 is configured to maintain the defined range of braking pressures and to determine an adjusted braking pressure for a particular wheel/axle and compensatory braking pressure(s) for the other wheels/axle of the vehicle in real-time. In other implementations, the controller 101 is configured to store a look-up table that defines a set of pressures to be applied to each wheel of the vehicle in order to avoid the problematic range of pressures corresponding to the NVH condition. FIG. 4 illustrates one example of such a look-up table. In the example of FIG. 4, braking force is typically applied equally to the front axle wheels and the rear axle wheels in order to achieve a target deceleration corresponding to a detected input rod travel/displacement. However, the vehicle has been determined to exhibit NVH noise when pressures lower than 10 bar are applied to the front axle wheels of the vehicle. Accordingly, the look-up table has been defined/configured to apply no braking pressure to the front axle wheels until the target deceleration and the detected input rod travel/displacement reach a magnitude where an equal pressure applied to both the front axle wheels and the rear axle wheels of the vehicle in order to achieve the target deceleration exceeds the defined range of problematic braking pressures for the front axle wheels.

In the example of FIG. 4, the defined range of problematic braking pressures for the front axle wheels includes all pressures greater than zero (0) bar and less than 10 bar. Accordingly, based on this look-up table, the controller 101 would apply no braking pressure to the front axle wheels until the input rod travel/displacement reaches 5 mm—at which point, the controller 101 causes 11 bar braking pressure to be applied to the front axle wheels and to the rear axle wheels to achieve a total vehicle deceleration of 1.1 m/s$^2$.

However, because no braking pressure is applied to the front axle wheels at this range of relatively low decelerations, the braking pressure applied to the rear axle wheels must be greater than usual in order to achieve the same target deceleration. As further illustrated in the graph of FIG. 5, under this control scheme, the braking pressure applied to the rear axle wheels (as indicated by the solid line) increases relatively quickly at lower decelerations and actually decreases once a target deceleration is large enough that the initial target braking pressure for the front axle wheels would be greater than the defined range of problematic braking pressures for the front axle wheels. Up until that point, all of the braking force for the vehicle is applied to the rear axle wheels—after that point, the braking force for the vehicle is applied equally to the front axle wheels and the rear axle wheels.

Figure 5:
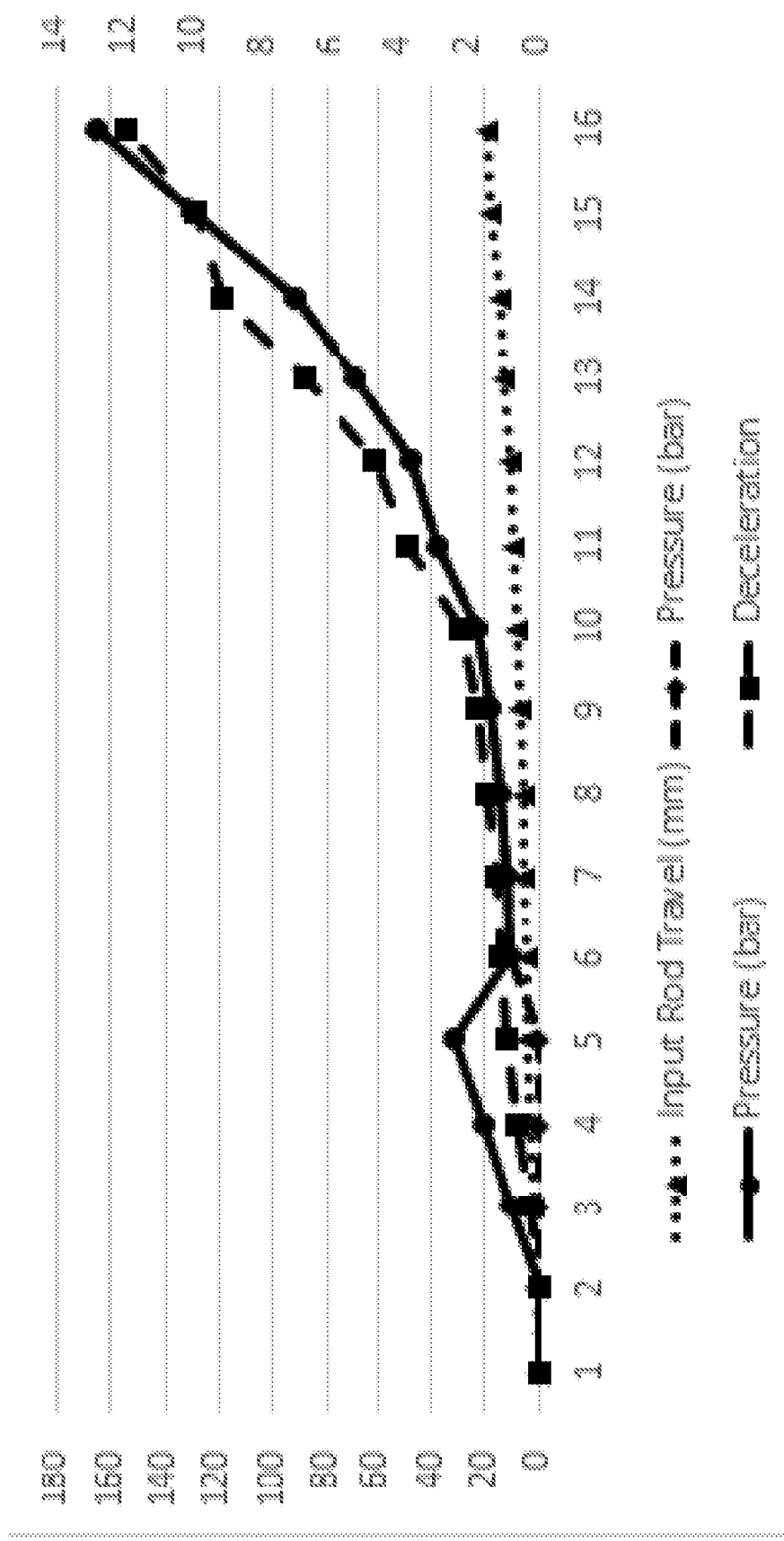
FIG. 5 is a graph illustrating various braking pressures and total vehicle deceleration according to the look-up table of FIG. 4.

The example of FIGS. 4 and 5 illustrates a situation where the adjusted braking pressure applied to the front axle wheels is decreased to maintain a braking pressure below the problematic range while the adjusted braking pressure applied to the rear axle wheels is increased to compensate in order to achieve the same target deceleration. However, in other implementations or in other situations, the controller 101 may be configured to increase the amount of braking pressure applied to the front axle wheels in order to maintain a braking pressure that is higher than the problematic range. In such cases, the controller 101 would also be configured to decrease the braking pressure applied to the rear axle wheels in order to compensate for the increased braking pressure of the front axle wheels and to achieve the target vehicle deceleration.

Thus, the invention provides, among other things, systems and methods for reducing or eliminating NVH noise by adjusting braking pressures applied to a particular wheel or axle to maintain braking pressures outside of a predefined range of braking pressures corresponding to a NVH condition for that wheel or axle. Various features and advantages of the invention are set forth in the following claims.

What is claimed is:

1. A brake system for a vehicle comprising:
    a brake pedal position sensor configured to detect a displacement position of a brake pedal of the vehicle; and
    an electronic controller configured to
        determine a target deceleration based at least in part on the detected displacement position of the brake pedal,
        access from a non-transitory, computer-readable memory a defined range of braking pressures corresponding to a noise, vibration, and harshness (NVH) condition for at least one wheel of the vehicle;
        preemptively determine an adjusted braking pressure to be applied to the at least one wheel of the vehicle based on the determined target deceleration and the defined range of braking pressures accessed from the memory, wherein the adjusted braking pressure is maintained outside of the defined range of braking pressures corresponding to the NVH condition for the at least one wheel, and
        transmit an adjusted braking force control signal to a braking actuator configured to cause the braking actuator to apply the adjusted braking pressure to the at least one wheel of the vehicle, wherein the electronic controller is configured to not transmit a control signal to the braking actuator configured to cause the braking actuator to apply any braking pressure to the at least one wheel of the vehicle that is within the defined range of braking pressures accessed from the memory before transmitting the adjusted braking force control signal.

2. The brake system of claim 1, wherein the electronic controller is further configured to
    determine an initial target braking force that, when applied equally to the at least one wheel of the vehicle and at least one additional wheel of the vehicle, achieve the target deceleration of the vehicle, and
    transmit an initial target braking force control signal to the braking actuator in response to determining that the initial target braking force is outside of the defined range of braking pressures for the at least one wheel corresponding to the NVH condition, wherein the initial target braking force control signal is configured to cause the braking actuator to apply the initial target braking force to the at least one wheel of the vehicle.

3. The brake system of claim 2, wherein the electronic controller is configured to determine the adjusted braking pressure to be applied to the at least one wheel of the vehicle by determining the adjusted braking pressure to be applied to the at least one wheel of the vehicle when the initial target braking force is within the defined range of braking pressures for the at least one wheel corresponding to the NVH condition, and wherein the electronic controller is further configured to
not transmit the initial target braking force control signal to the braking actuator in response to determining that the initial target braking force is within the defined range of braking pressures for the at least one wheel corresponding to the NVH condition, and
determine a second adjusted braking pressure to be applied to the at least one additional wheel when the initial target braking force is within the defined range of braking pressures for the at least one wheel corresponding to the NVH condition, wherein the second adjusted braking pressure is a braking pressure applied to the at least one additional wheel of the vehicle necessary to achieve the target deceleration of the vehicle if the adjusted braking pressure is applied to the at least one wheel of the vehicle.

4. The brake system of claim 1, wherein the electronic controller is further configured to
apply an equally distributed braking pressure to all wheels of the vehicle when the equally distributed braking pressure necessary to achieve the target deceleration is outside of the defined range of braking pressures corresponding to the NVH condition for the at least one wheel,
determine a second adjusted braking pressure to be applied to at least one additional wheel when the equally distributed braking pressure corresponding to the target deceleration would be within the defined range of braking pressures corresponding to the NVH condition for the at least one wheel,
wherein the second adjusted braking pressure is a braking pressure calculated to achieve the target deceleration when the adjusted braking pressure is applied to the at least one wheel and the second adjusted braking pressure is applied to the at least one additional wheel, and
transmit a second adjusted braking force control signal to the braking actuator configured to cause the braking actuator to apply the second adjusted braking pressure to the at least one additional wheel of the vehicle.

5. The brake system of claim 1, wherein the electronic controller is configured to determine the adjusted braking pressure to be applied to the at least one wheel of the vehicle by determining an adjusted front axle braking pressure to be applied to a pair of front axle wheels of the vehicle.

6. The brake system of claim 5, wherein the adjusted braking force control signal transmitted to the braking actuator is configured to cause the braking actuator to apply a first braking pressure to the front axle wheels of the vehicle and to apply a second braking pressure to one or more rear axle wheels of the vehicle,
wherein the first braking pressure is defined based on the second braking pressure for target decelerations where defining the first braking pressure based on the second braking pressure does not require the first braking pressure to be within the defined range of braking pressures corresponding to the NVH condition in order to achieve the target deceleration, and
wherein the NVH condition for the at least one wheel is an NVH condition for the front axle of the vehicle.

7. The brake system of claim 6, wherein the first braking pressure is defined based on the second braking pressure by defining the first braking pressure as equal to the second braking pressure.

8. The brake system of claim 6, wherein the electronic controller is configured to determine the adjusted front axle braking pressure by determining the adjusted front axle braking pressure for target decelerations where defining the first braking pressure based on the second braking pressure would require the first braking pressure to be within the defined range of braking pressures to achieve the target deceleration, and
wherein the electronic controller is further configured to determine an adjusted rear axle braking pressure necessary to achieve the target deceleration when the adjusted front axle braking pressure is applied to the front axle wheels.

9. The brake system of claim 1, wherein the electronic controller is configured to determine the adjusted braking pressure to be applied to the at least one wheel of the vehicle by setting the adjusted braking pressure as equal to a lower adjusted braking pressure that is less than the defined range of pressures, and
wherein the electronic controller is further configured to determine a second adjusted braking pressure to be applied to at least one additional wheel of the vehicle, wherein the second adjusted braking pressure is an increased braking pressure defined to compensate for the lower adjusted braking pressure applied to the at least one wheel of the vehicle in order to achieve the target deceleration.

10. The brake system of claim 1, wherein the electronic controller is configured to determine the adjusted braking pressure to be applied to the at least one wheel of the vehicle by setting the adjusted braking pressure as equal to a higher adjusted braking pressure that is greater than the defined range of pressures, and
wherein the electronic controller is further configured to determine a second adjusted braking pressure to be applied to at least one additional wheel of the vehicle, wherein the second adjusted braking pressure is a decreased braking pressure defined to compensate for the higher adjusted braking pressure applied to the at least one wheel of the vehicle in order to achieve the target deceleration.

11. A method for controlling a vehicle braking system, the method comprising:
determining, by an electronic controller, a target deceleration based at least in part on a detected displacement position of a brake pedal;
accessing, from a non-transitory computer-readable memory, a defined range of braking pressures corresponding to a noise, vibration, and harshness (NVH) condition for at least one wheel of the vehicle;
determining, by the electronic controller, an adjusted braking pressure to be applied to the at least one wheel of the vehicle based on the determined target deceleration and the defined range of braking pressures accessed from the memory, wherein the adjusted braking pressure is maintained outside of the defined range of braking pressures corresponding to the NVH condition for the at least one wheel; and
applying the adjusted braking pressure to the at least one wheel of the vehicle, wherein no braking pressure that is within the defined range of braking pressures accessed from the memory is applied to the at least one wheel of the vehicle before applying the adjusted braking pressure.

12. The method of claim 11, further comprising:
determining an initial target braking force that, when applied equally to the at least one wheel of the vehicle and at least one additional wheel of the vehicle, achieve the target deceleration of the vehicle; and
applying the initial target braking force to the at least one wheel of the vehicle when the initial target braking force is outside of the defined range of braking pressures for the at least one wheel corresponding to the NVH condition.

13. The method of claim 12, wherein determining the adjusted braking pressure to be applied to the at least one wheel of the vehicle includes determining the adjusted braking pressure to be applied to the at least one wheel of the vehicle when the initial target braking force is within the defined range of braking pressures for the at least one wheel corresponding to the NVH condition, and
the method further comprising:
not applying the initial target braking force to the at least one wheel when the initial target braking force is within the defined range; and
determining a second adjusted braking pressure to be applied to the at least one additional wheel when the initial target braking force is within the defined range of braking pressures for the at least one wheel corresponding to the NVH condition, wherein the second adjusted braking pressure is a braking pressure applied to the at least one additional wheel of the vehicle necessary to achieve the target deceleration of the vehicle if the adjusted braking pressure is applied to the at least one wheel of the vehicle.

14. The method of claim 11, further comprising:
applying an equally distributed braking pressure to all wheels of the vehicle when the equally distributed braking pressure necessary to achieve the target deceleration is outside of the defined range of braking pressures corresponding to the NVH condition for the at least one wheel;
determining a second adjusted braking pressure to be applied to at least one additional wheel when the equally distributed braking pressure corresponding to the target deceleration would be within the defined range of braking pressures corresponding to the NVH condition for the at least one wheel,
wherein the second adjusted braking pressure is a braking pressure calculated to achieve the target deceleration when the adjusted braking pressure is applied to the at least one wheel and the second adjusted braking pressure is applied to the at least one additional wheel; and
applying the second adjusted braking pressure to the at least one additional wheel of the vehicle.

15. The method of claim 11, wherein determining the adjusted braking pressure to be applied to the at least one wheel of the vehicle includes determining an adjusted front axle braking pressure to be applied to a pair of front axle wheels of the vehicle.

16. The method of claim 15, further comprising applying a first braking pressure to the front axle wheels of the vehicle and applying a second braking pressure to one or more rear axle wheels of the vehicle,
wherein the first braking pressure is defined based on the second braking pressure for target decelerations where defining the first braking pressure based on the second braking pressure does not require the first braking pressure to be within the defined range of braking pressures corresponding to the NVH condition to achieve the target deceleration, and
wherein the NVH condition for the at least one wheel is an NVH condition for the front axle of the vehicle.

17. The method of claim 16, wherein the first braking pressure is defined based on the second braking pressure by defining the first braking pressure as equal to the second braking pressure.

18. The method of claim 16, wherein determining the adjusted front axle braking pressure includes determining the adjusted front axle braking pressure for target decelerations where defining the first braking pressure based on the second braking pressure would require the first braking pressure to be within the defined range of braking pressures to achieve the target deceleration, and
further comprising determining an adjusted rear axle braking pressure necessary to achieve the target deceleration when the adjusted front axle braking pressure is applied to the front axle wheels.

19. The method of claim 11, wherein determining the adjusted braking pressure to be applied to the at least one wheel of the vehicle includes setting the adjusted braking pressure as equal to a lower adjusted braking pressure that is less than the defined range of pressures, and
further comprising determining a second adjusted braking pressure to be applied to at least one additional wheel of the vehicle, wherein the second adjusted braking pressure is an increased braking pressure defined to compensate for the lower adjusted braking pressure applied to the at least one wheel of the vehicle in order to achieve the target deceleration.

20. The brake system of claim 11, wherein determining the adjusted braking pressure to be applied to the at least one wheel of the vehicle includes setting the adjusted braking pressure as equal to a higher adjusted braking pressure that is greater than the defined range of pressures, and
further comprising determining a second adjusted braking pressure to be applied to at least one additional wheel of the vehicle, wherein the second adjusted braking pressure is a decreased braking pressure defined to compensate for the higher adjusted braking pressure applied to the at least one wheel of the vehicle in order to achieve the target deceleration.

* * * * *